(No Model.)
P. POULSON.
SPADE.
No. 479,661. Patented July 26, 1892.
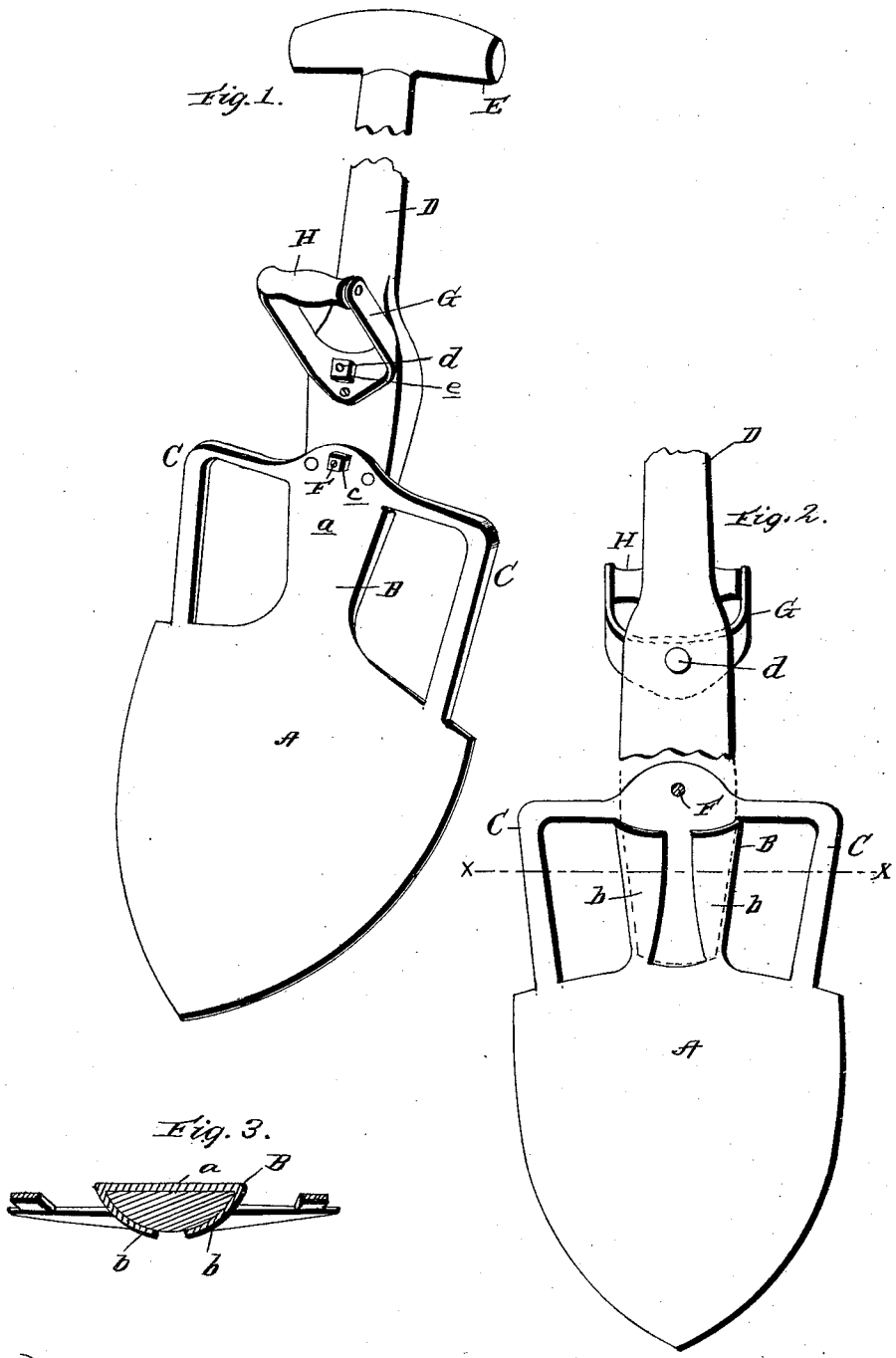

UNITED STATES PATENT OFFICE.

PETER POULSON, OF SOMERS, WISCONSIN.

SPADE.

SPECIFICATION forming part of Letters Patent No. 479,661, dated July 26, 1892.

Application filed July 14, 1891. Serial No. 399,665. (No model.)

*To all whom it may concern:*

Be it known that I, PETER POULSON, a citizen of the United States, residing at Somers, in the county of Kenosha and State of Wisconsin, have invented certain new and useful Improvements in Spades; and I do declare the following to be a full, clear, and exact description of the invention, such as will enable others skilled in the art to which it appertains to make and use the same.

My invention has relation to improvements in spades; and it consists in the construction, novel combination, and adaptation of parts hereinafter described, and particularly pointed out in the claim appended.

In the accompanying drawings, Figure 1 is a perspective view of my improved spade. Fig. 2 is a rear elevation thereof with the upper portion of the handle broken away; and Fig. 3 is a horizontal section taken in the plane indicated by the line $x$ $x$ of Fig. 2, illustrating to a better advantage the connection of the blade to the handle.

In the said drawings similar letters designate corresponding parts throughout the several views, referring to which—

A indicates the blade of my improved spade, which is of an approximate shield shape, as illustrated, and is provided on its upper edge with an integral socket-neck B, which is designed to receive the handle and comprises the front wall $a$ and the rearwardly and laterally bent portions $b$, as better illustrated in Figs. 2 and 3 of the drawings.

Formed integral with the upper end of the front wall of the socket-neck B are pedal branches C, which extend laterally from said neck and thence downwardly, where their ends merge into the blade, as better illustrated in Fig. 1. The upper edges of the horizontal portions of the pedal branches C are preferably flattened, so as to present a broad foothold, and by the provision of the said branches it will be readily perceived that the blade is adapted to easily be forced deep into the ground and to perform the work of a much longer and heavier blade.

D indicates the handle of my improved spade, which is provided at its upper end with a T branch E, which is preferably rounded, as illustrated, and affords a convenient and firm hand-grasp.

The lower end of the handle D is enlarged, as better illustrated in Fig. 1 of the drawings, and the enlarged portion, which is curved, as shown, tapers toward its lower end to conform to the shape of the socket-neck B, into which it takes and is secured by a bolt F, which takes through the handle and the front wall of the socket-neck and is secured in turn by a nut $c$. By this construction it will be seen that a rigid and secure connection is effected between the blade and the handle, and it will be further perceived that when desired the handle and blade may be readily disconnected without in any manner damaging either one.

G indicates the bail of an auxiliary hand-grasp, which is secured to the front side of the enlarged portion of the handle by the bolt $d$, which takes through the handle and is secured by a nut $e$, whereby it will be seen that the bail G and hand-grasp H thereof may be readily disconnected from the handle, if desirable.

With a spade of the construction described it will be seen that an operator may grasp the T branch with one hand and the lower grasp H with the other to force the spade into the ground, after which, by applying his foot to the horizontal portion of the pedal branches, he may force the blade deep into the ground.

Although I have specifically described the construction and relative arrangement of the several elements of my improved spade, yet I do not desire to be confined to the same, as it is obvious that such modifications may be made as fairly fall within the scope of my invention.

Having described my invention, what I claim, and desire to secure by Letters Patent, is—

In a spade substantially as described, the combination, with the blade provided on its upper edge with an integral socket-neck formed by a front wall and the rearwardly and laterally bent portions and the pedal branches formed integral with the socket-neck and blade and extending laterally and downwardly, the blade, socket-neck, and pedal branches being formed from a single blank having the portions struck therefrom and bent rearwardly and laterally so as to form the pedal branches and the socket-neck, of a handle having its lower portion enlarged and tapered toward its end to conform to the shape of the socket-neck and a suitable means for fastening the handle in the said socket-neck, substantially as specified.

In testimony whereof I affix my signature in presence of two witnesses.

PETER POULSON.

Witnesses:
 MORTEN RASMUSSEN,
 ANDREAS MADSEN.